April 9, 1929.　　C. N. McCLINTOCK　　1,708,843
SAW SHARPENING GAUGE
Filed April 16, 1928
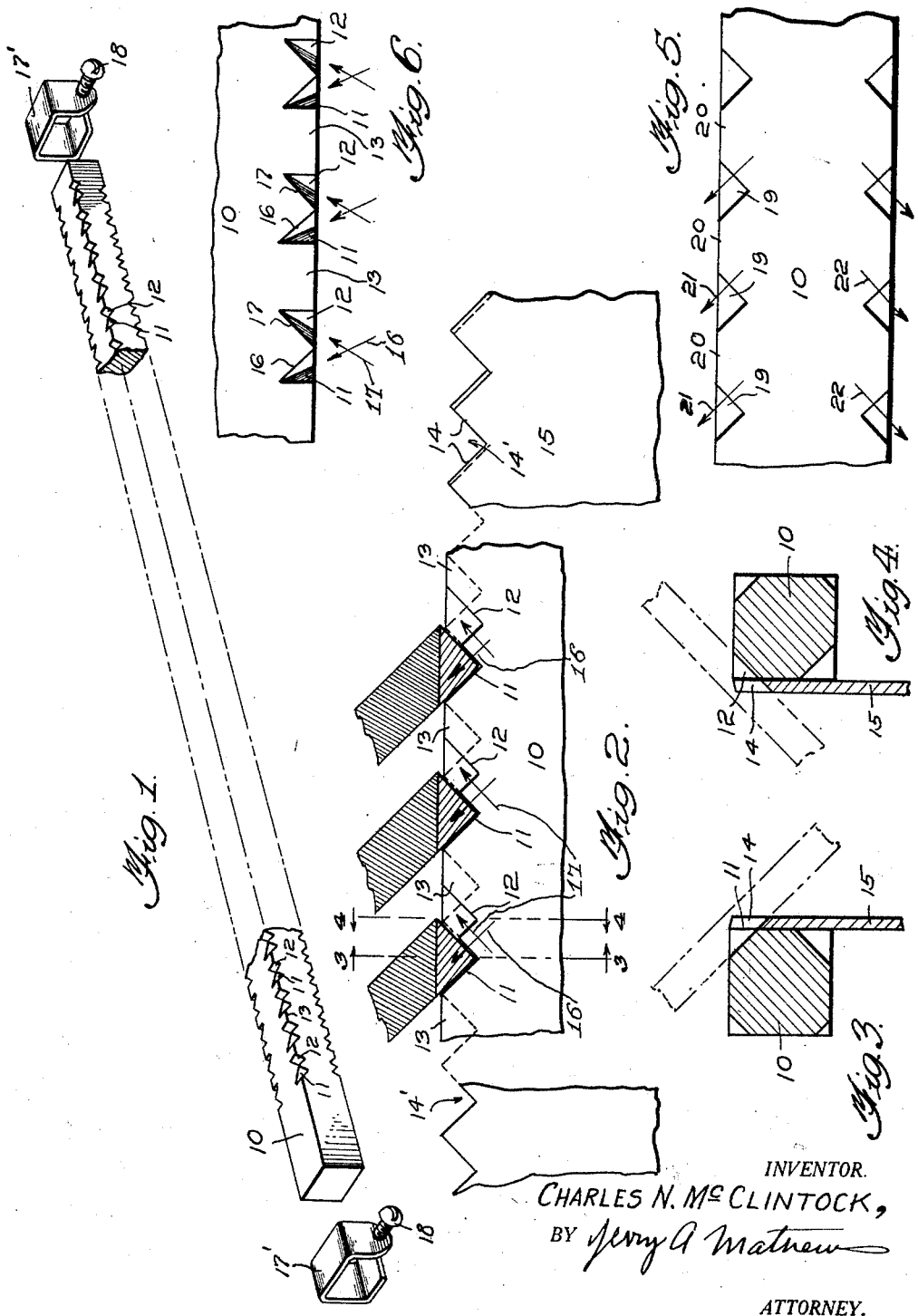
INVENTOR.
CHARLES N. McCLINTOCK,
BY *Jerry A. Mathew*
ATTORNEY.

Patented Apr. 9, 1929.

1,708,843

UNITED STATES PATENT OFFICE.

CHARLES N. McCLINTOCK, OF FLINT, MICHIGAN.

SAW-SHARPENING GAUGE.

Application filed April 16, 1928. Serial No. 270,565.

My invention relates to saw sharpening gauges.

As is well known, considerable difficulty is experienced in the proper sharpening of saws, particularly crosscut saws, by those not particularly skillful. In the sharpening of a cross cut saw, alternate teeth must be sharpened, whereby their bevels extend in opposite directions. This is accomplished by filing within alternate notches occurring between the teeth. An inexperienced operator frequently fails to follow the alternate sharpening of the teeth, and when this is done the proper bevel or angle of the teeth may not be obtained, or the teeth may be cut down at their bases, to different elevations.

The present invention seeks to overcome these difficulties, which is accomplished by the provision of a very simple and inexpensive gauge. The gauge is in the form of a preferably square bar which is case-hardened. On the edges of the bar are cut the gauge openings or notches, with filler teeth between them, which are adapted to cover or block the alternate teeth of the saws, which are not to be sharpened while one set of the teeth are being sharpened. I have found that the two sets of gauge openings or notches, with the filler teeth may be formed at one edge of the bar, but where the saw teeth are larger, it is preferred to form one set of gauge notches upon one edge and the companion set of notches upon the next edge.

The bar is held to the side of the saw, adjacent to the teeth by simple clamps, and the bar may be readily adjusted to bring the proper set of notches into registration with the set of teeth to be sharpened. Each bar may carry a plurality of sizes of gauges or notches.

In the accompanying drawings, forming a part of this specification, and in which like numerals are employed to designate like parts throughout the same, Figure 1 is a perspective view of a saw sharpening gauge embodying my invention, Figure 2 is an enlarged fragmentary view showing the gauge applied to the saw, illustrating the two sets of gauge notches, formed upon one edge of the bar, Figure 3 is a transverse section taken on line 3—3 of Figure 2, Figure 4 is a similar view taken on line 4—4 of Figure 2, and, Figure 5 is an enlarged fragmentary side elevation of the gauge, showing the two sets of gauge notches formed upon different edges of the gauge bar.

Figure 6 is an enlarged fragmentary view showing the gauge notches in detail.

In the drawings, wherein for the purpose of illustration, is shown a preferred embodiment of my invention, the numeral 10 designates a gauge bar, which is preferably square in cross section and case-hardened. Formed upon each edge of the bar 10 are spaced pairs of gauge notches or recesses 11 and 12, which are V-shaped, as shown. These pairs of notches are separated by covering teeth 13, which extend above the notches, for a substantial distance, as shown. The notches 11 and 12 are of the same shape and have the longitudinal axes of their side walls arranged at the same angle. Alternate side walls of the notches 11 and 12 are longitudinally parallel.

The side walls of the notches 11 and 12 are set at the same angle as the side walls of the teeth 14 of the saw 15. The set of notches 11 have their side walls transversely beveled in one direction, as indicated by the arrow 16, while the notches 12 have their side walls transversely beveled in an opposite direction, as shown at 17.

The bar 10 may be provided upon each of its edges with the sets of gauge notches and covering teeth, the same being made in different sizes, for co-action with saws having teeth of different gauges.

In the use of the gauge, the bar 10 is arranged upon one side of the saw blade, and the ends of the bar are inserted in hollow rectangular clamps 17. These clamps carry clamping screws 18, which serve to bind the bar to the saw blade. The bar 10 is adjusted so that the notches 11 will register with the openings 14' between alternate teeth, the walls of these notches being slightly beneath the walls of said openings, depending upon the extent of sharpening desired. The operator stands upon the side of the saw remote from the bar 10 and since the covering teeth 13 extend across alternate openings, the file is inserted in the uncovered openings. The filing proceeds in the usual manner and the notches 11 will serve to guide the file giving the proper angle, and will also limit the extent of filing. In this manner, one alternate set of teeth 14 are sharpened, after which the bar 10 is adjusted so that the notches 12 register with the spaces 14' between the set of unsharpened teeth 14, the covering teeth 13 now covering the notches between the sharpened set of teeth. The bevel of the walls of the notches 12 being opposite to that of the notches 11, the remaining set of teeth are sharpened to produce the desired opposite bevel.

In Figure 5, I have illustrated a modification of the invention. In this figure, one set of gauge notches 19 are provided, which are V-shaped. These gauge notches are spaced by covering teeth 20, alternately arranged therewith. The gauge notches have their side walls arranged at the same angle, whereby alternate side walls are parallel. The side walls of the gauge notches are longitudinally parallel with the side walls of the teeth of the saw. The side walls of the notches 19 are transversely beveled in the same direction, as indicated by the arrows 21. Only one set of gauge notches 19 are formed upon one edge, while the other set of gauge notches 19 is formed upon the next edge, the construction and arrangement being identical, excepting that the side walls of these notches are transversely beveled in an opposite direction, as indicated by the arrows 22.

In the use of this form of gauge, the bar 10 is held upon the saw so that the notches 19 register with the notches between alternate teeth, while the cover teeth 20, cover the notches between alternate teeth. Hence only one set of saw teeth may be sharpened. The other set is sharpened by turning the bar upon its longitudinal axis to present the other set of notches into registration with the notches between the saw teeth, which have not been sharpened.

It is to be understood that the forms of my invention, herewith shown and described, are to be taken as preferred examples of the same, and that various changes in the shape, size and arrangement of parts may be resorted to without departing from the spirit of my invention, or the scope of the subjoined claims.

Having thus described my invention, I claim:

1. A saw sharpening gauge comprising a rectangular bar provided upon its edges with gauge notches, said bar being adapted to be turned upon its longitudinal axis so that selected notches may be presented to the spaces between the saw teeth, and means to clamp the bar to the saw blade.

2. A saw sharpening gauge comprising a bar rectangular in cross section for providing edges, said edges being provided with gauge notches, and loop clamps to receive the ends of the bar and to also receive the saw blade.

3. A saw sharpening gauge comprising a bar which is polygonal in cross section for affording edges, said edges being provided with spaced pairs of gauge notches and covering teeth, said covering teeth being arranged between the pairs of gauge notches.

4. A saw sharpening gauge comprising a bar having an edge, said bar being provided upon said edge with spaced gauge notches and covering teeth, said covering teeth being arranged between the gauge notches.

In testimony whereof I affix my signature.

CHARLES N. McCLINTOCK.